US00RE48502E

(19) United States
(12) Reissued Patent
Amidon et al.

(10) Patent Number: US RE48,502 E
(45) Date of Reissued Patent: Apr. 6, 2021

(54) BARRIER FOR ABSORBING LIVE FIRE AMMUNITION AND USES THEREOF

(71) Applicant: 360° Ballistics, LLC

(72) Inventors: Clayton Dean Amidon, Zebulon, NC (US); Mark Alan Siver, Wake Forest, NC (US)

(73) Assignee: 360° BALLISTICS, LLC, Wake Forest, NC (US)

(21) Appl. No.: 15/689,637

(22) Filed: Aug. 29, 2017

Related U.S. Patent Documents

Reissue of:
(64) Patent No.: 9,121,675
Issued: Sep. 1, 2015
Appl. No.: 14/546,002
Filed: Nov. 18, 2014

(51) Int. Cl.

| | |
|---|---|
| ***C04B 7/02*** | (2006.01) |
| ***B28B 1/14*** | (2006.01) |
| ***F41J 13/00*** | (2009.01) |
| ***C04B 14/16*** | (2006.01) |
| ***B28B 3/00*** | (2006.01) |
| ***C04B 16/06*** | (2006.01) |
| ***C04B 14/00*** | (2006.01) |
| ***C04B 14/28*** | (2006.01) |
| ***C04B 28/04*** | (2006.01) |

(52) U.S. Cl.
CPC ..... *F41J 13/00* (2013.01); *B28B 1/14* (2013.01); *C04B 28/04* (2013.01)

(58) Field of Classification Search
CPC ..... C04B 28/04; C04B 7/02; C04B 14/00; C04B 16/0625; C04B 14/02; C04B 14/366; C04B 40/0028; C04B 14/303; C04B 2103/304; F41J 13/00; B28B 1/14
See application file for complete search history.

(56) References Cited

U.S. PATENT DOCUMENTS

| | | | |
|---|---|---|---|
| 4,046,582 | A | 9/1977 | Kawamura |
| 4,249,948 | A | 2/1981 | Okada |
| 4,391,664 | A | 7/1983 | Kramer |
| 4,488,910 | A | 12/1984 | Nicholson |
| 4,737,193 | A | 4/1988 | Gutmann |
| 5,456,752 | A | 10/1995 | Hogan |
| 5,976,656 | A | 11/1999 | Giraud |
| 6,264,735 | B1 | 7/2001 | Bean |
| 6,423,134 | B1 | 7/2002 | Trottier |
| 6,582,511 | B1 | 6/2003 | Velpari |
| 6,620,236 | B2 | 9/2003 | Huntsman |
| 6,688,811 | B2 | 2/2004 | Forrester |
| 6,758,897 | B2 | 7/2004 | Rieder |
| 6,972,100 | B2 | 12/2005 | Minke et al. |
| 7,111,847 | B2 | 9/2006 | Larson |

(Continued)

OTHER PUBLICATIONS

Hudson, Kenneth L. et al., Final Report Demonstration of Shock-Absorbing Concrete (SACON) Bullet Trap Technolog (Report No. ATC-8183), Aug. 1999, 219 pages, U.S. Army Environmental Center, Aberdeen Proving Ground, MD 21010-5401.

(Continued)

*Primary Examiner* — Elizabeth L McKane
(74) *Attorney, Agent, or Firm* — Neo IP

(57) ABSTRACT

This disclosure is directed to an improved ballistic concrete barrier and methods of using the barrier for training with weapons using live ammunition or grenades or other fragmentation devices.

29 Claims, 2 Drawing Sheets

(56) References Cited

U.S. PATENT DOCUMENTS

| | | | | |
|---|---|---|---|---|
| 7,243,921 | B2 | 7/2007 | Larson | |
| 7,562,613 | B2 | 7/2009 | Ahmad | |
| 7,677,151 | B2 | 3/2010 | Ahmad | |
| 7,748,307 | B2 | 7/2010 | Hallissy et al. | |
| 7,849,780 | B1 | 12/2010 | Hallissy et al. | |
| 7,867,432 | B2 * | 1/2011 | Hargrove | B28B 1/14 264/297.9 |
| 2007/0062143 | A1 | 3/2007 | Noushad | |
| 2008/0092471 | A1 | 4/2008 | Ahmad | |
| 2009/0282969 | A1 | 11/2009 | Ahmad | |
| 2010/0229715 | A1 | 9/2010 | Tonyan | |
| 2010/0230035 | A1 | 9/2010 | Frank | |
| 2014/0150362 | A1 | 6/2014 | Propst | |
| 2015/0315798 | A1 | 11/2015 | Propst | |

OTHER PUBLICATIONS

Technical Specification for Shock Absorbing Concrete (SACON. RTM.)—Shock Absorbing Concrete for Constructing Live-Fire Training Facilities, Document metadata bears creation date of Feb. 12, 2007, 25 pages, U.S. Army Corps of Engineers.

Whiting, David A., Manual on Control of Air Content in Concrete, 1998, 52 pages, Portland Cement Association, Skokie, Illinois. USA.

Graham, Mark, Office Action re related U.S. Appl. No. 13/449,420, filed Mar. 6, 2014, 4 pages, plus Notice of Reference Cited, and examined claims, United States Patent & Trademark Office.

* cited by examiner

FIG. 1

PRIOR ART 1000

| | |
|---|---|
| 1004 | Create mix |
| 1008 | Generate foam using air compressor foaming agents and foam stabilizing agents based upon batch size of the mix |
| 1012 | Add half the foam |
| 1016 | Check pre-fiber density |
| 1020 | Add half of the remaining foam if needed. |
| 1024 | Check pre-fiber density |
| 1028 | Branch<br>Go To 1020 if density is high<br>Else Go To 1032. |
| 1032 | Add fiber and mix to distribute the fiber. |
| 1036 | Test final density |
| 1040 | Branch<br>If density is below target for particular fiber type Go To step 1032<br>If density has reached target for particular fiber type Go To step 1044 |
| 1044 | Put ballistic concrete into mold |

BARRIER FOR ABSORBING LIVE FIRE AMMUNITION AND USES THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a reissue application of U.S. Pat. No. 9,121,675 issued Sep. 1, 2015.*

FIELD OF THE DISCLOSURE

This disclosure relates to an improved ballistic concrete barrier and methods of using the barrier for training with weapons firing live ammunition. Training facilities need backstops or other components which can safely absorb live ammunition.

BACKGROUND OF THE DISCLOSURE

Shock Absorbing Concrete (SACON®)

Training is essential for both the military and civilian police forces. However, designing adequate backstops for military training, police, or civilian target practice, has been difficult. There are many difficulties associated with preparing such backstops. For example, a material must be strong enough to stop bullets, yet also must not cause ricochets because of risk to a shooter or bystander and must minimize the creation of lead dust from bullets spalling or fragmenting on impact. Wood backstops are problematic because insect or vermin infestation may lead to degradation and breakdown. Chemical treatment of wood creates additional environmental hazards associated with biocides or other toxins. Earthen barriers are difficult to move and stage in different settings, such as different lighting conditions. Over time earthen barriers may erode or wash away. Historically, fiber reinforced foamed concrete provided some benefits for training structures as a material that (1) resisted breakdown, (2) stopped bullets, and (3) prevented ricochets.

Lead from bullets is another fundamental problem. Lead is a heavy metal neurotoxin that accumulates over time in soft tissues, blood and bone. Exposures to extremely low concentrations of lead have been documented to cause learning disabilities and other neurological damage. Thus, lead is hazard with a potential for long-term harm. Lead from bullets may enter the environment as either elemental lead dust generated from the impact of bullets with the backstop or lead salts which may leach from the backstop into water supplies.

To address many of these concerns, researchers at the U.S. Army Engineer Research and Development Center (ERDC) invented SACON® ballistic concrete, a low-leaching, foamed concrete. SACON® ballistic concrete is effective absorbing low power projectiles and eliminating ricochets. As currently formulated it is a fiber-reinforced concrete with high concentrations of calcium phosphate and aluminum hydroxide to prevent leaching of lead fragments. U.S. Pat. No. 6,264,735 (Bean et al., "the '735 patent") describes SACON® and the reduced lead-leaching from the SACON® ballistic concrete blocks. U.S. Pat. No. 6,620,236

(Huntsman et al., "the '236 patent") describes an improvement of the '735 patent formulation that includes an aluminum hydroxide additive to reduce or eliminate the erosion of heavy metals such as lead from the foamed concrete. The contents of both the '735 and the '236 patents are hereby incorporated by reference in its entirety.

SACON® ballistic concrete is prepared using an air compressor by adding a wet foam that contains a foaming agent and a foam stabilizing agent such as hydroxypropyl methyl cellulose. The wet foam is added to the concrete mixture to achieve the appropriate density required by the military specifications. SACON® ballistic concrete has been widely used by the military on bases in the U.S. and abroad. It has been used by other government agencies, e.g., police forces or the Drug Enforcement Agency. It is effective in stopping bullets from conventional small arms such as rifles (0.22 caliber, M16 (5.56 mm)) or pistols (0.38 caliber, 0.45 caliber, and 9 mm) The reported penetration depths range from 1 inch (25 mm) for a 0.38 caliber pistol to 2.55 inches (63 mm) for 5.56 mm (M16 rifle), see Hudson et al., Final Report Demonstration of Shock-Absorbing Concrete (SACON) Bullet Trap Technology, August 1999.

Training facilities use a number of barriers made from precast panels or other shapes to form backstops, simulated buildings, villages, or other structures such as a tank. When combining precast panels together to make a barrier such as a wall or other structure, the precast panel will include features to allow the precast panels to be connected to one another. However, the majority of the precast panel will be bullet absorbing structural components which are intended to capture live fire bullets or projectiles from other munitions such as grenades.

Process for Making Traditional SACON® Ballistic Concrete

Traditional SACON® ballistic concrete is prepared following ERDC specifications. By ERDC specifications it is meant the "Technical Specification for Shock Absorbing Concrete (SACON®)—Shock Absorbing Concrete for Constructing Live-Fire Training Facilities. This 25 page specification with reference to 35 other detailed specifications sets forth in great detail a process for creating a ballistic concrete and using the ballistic concrete to create panels and other structures using the ballistic concrete. The precision of this specification and the requirement for testing involving shooting live ammunition and measuring the depth of penetration of the bullet is a recognition of those in skill in the art of the great difficulties in creating a ballistic concrete that is capable of stopping penetration of a bullet within an acceptable depth without allowing the bullet to ricochet off the surface of the panel.

ERDC Specifications require the following ingredients:

| Ingredient | Cubic Meter | Cubic Yard |
|---|---|---|
| Portland Cement | 577 kg (1272 lbs.) | 972 lbs. (441 kg) |
| Fine Aggregate (SSD) | 577 kg (1272 lbs.) | 972 lbs. (441 kg) |
| Water | 277 kg (611 lbs.) | 466 lbs. (211 kg) |
| Calcium Phosphate | 5.78 kg (12.7 lbs.) | 9.72 lbs. (4.4 kg) |
| Aluminum Hydroxide | 5.78 kg (12.7 lbs.) | 9.72 lbs. (4.4 kg) |
| Foam Stabilizer | 0.15 kg (0.33 lbs.) | 0.25 lbs. (0.11 kg) |
| Foam (Void System) | 0.33 $m^3$ (11.7 cu ft.) | 9.0 cu ft. (0.25 $m^3$) |
| Fiber (choice of) | | |
| Polypropylene | 8.8 kg (19.4 lbs.) | 14.8 lbs. (6.7 kg) |
| Steel | 115 kg (254 lbs.) | 193 lbs. (88 kg) |

ERDC requires the use of a foaming agent and foam stabilizing agents. Specifically they require:

Section 2.4.1 Foaming Agents: Foaming agent shall comply with ASTM C 869, tested in accordance with ASTM 796; and Section 2.4.2 Foam Stabilizing Agents: The stabilizing agent shall contain hydroxypropyl methylcellulose powder limited to 19.0 to 24.0% methoxy and 7.0 to 12.0% hydroxypropoxyl, similar to Dow Chemical Co. K100M.

Traditional SACON® ballistic concrete uses an air compressor and water to generate pre-formed foam.

Traditional SACON® ballistic concrete specifications require meeting the following density standards:

Density (Without fibers) 1442 kg/m$^3$ (90-pcf)

(With polypropylene fibers) 1458 kg/m$^3$ (91-pcf)

(With steel fibers) 1554 kg/m$^3$ (97-pcf)

The foam is added to the mix, as follows using the ERDC specifications. The void material, pre-formed foam shall be added to the cement slurry to obtain the required density. The material shall be added in increments to reduce the possibility of moving outside the SACON® ballistic concrete density tolerances. The recommended procedure is to add the foam in half increments, i.e., add half of the foam initially by time of insertion and calculate the density. If the density remains above the upper tolerance, add half of the remaining foam and re-calculate the density. If the density continues to remain above the upper tolerance, then add half of remaining foam until the density tolerance of +48 kg/m$^3$ (3-pcf) relative to the target density (based on fiber use) has been achieved.

SACON® ballistic concrete is traditionally installed in modular panels that are typically 24" to 30" thick. Panels may be considered compromised when they have been penetrated by greater than 50% of the thickness of the panel, both because of the danger of collapse of the panel and because of the danger of shoot through if the panel is hit at the same point a second time. The panel may be repaired with ballistic concrete or replaced.

FIG. 1 sets forth the prior art process 1000 for making SACON® ballistic concrete.

Step 1004—Create mix without foam.

Step 1008—Create foam (this step could be completed before creating the mix).

Step 1012—Add half the foam to the mix.

Step 1016—Check density of mix plus added foam to see if the density is in range. Note that the target range for density is a pre-fiber target. Anecdotal reports indicate that frequently it is difficult to get the mix into the pre-fiber density range.

Step 1020—Add half of remaining foam if needed to reduce density.

Step 1024—Check density of mix plus added foam to see the density is in desired pre-fiber density range.

Step 1028—If density is too high, go to 1020. If density is now in range, go to 1032.

Step 1032—Add the prescribed fiber and mix.

Step 1036—Test final density. Adding fiber increases the density of the ballistic concrete. Thus, a pre-fiber density of 90 pounds per cubic foot may be increased to a target of 91 pounds per cubic foot when using polypropylene fibers or 97 pounds per cubic foot when using steel fibers.

Step 1040—Branch based on whether the final density has reached the density for the particular fiber. If not, go to 1036. If the density has been reached then proceed to step 1044.

Step 1044—Pour the ballistic concrete into the mold.

Note—Due to the fragility of the foam bubbles within the prior art ballistic concrete mix, the Technical Specifications for Shock Absorbing Concrete (SACON®)-Shock Absorbing Concrete for Constructing Live-Fire Training Facilities has a number of limitations on how the mixed ballistic concrete material is handled. For example, in section 3.6.1 Placement Operations—there is a prohibition against any vertical drops of 2 feet or more absent special authorization and special equipment. The concern from a drop is that a drop larger than 2 feet may destroy a large percentage of the foamed bubbles.

Likewise a horizontal layer shall not exceed more than 2 feet. Here the concern is that the weight of the ballistic concrete on the lower portions of a deep pour would destroy an unacceptable percentage of the foam bubbles. This depth of pour limitation means that wall panels that will be more than two feet tall need to be poured with the height of the final wall in a horizontal plane. This limitation combined with the depth of drop limit precludes pouring a wall in place as the wall cannot be oriented with the height dimension arranged in a vertical orientation. To pour a panel with a thickness of more than two feet, the panel is poured on its side with a trough to lower the ballistic concrete into the form.

Yet another limitation on the treatment of the prior art ballistic concrete material is a requirement that poured SACON® panels are not to be moved for a period of 14 days. The sides of forms may be removed after 3 days. There is a fear of internal cracking in the poured panels if the forms are removed early. Given that wall panels will need to be poured with the long dimensions (wall height and width) placed in a horizontal plane, so that the short dimension (wall thickness) is in the vertical orientation—the large panel sized bottom portions of the mold are tied up for 14 days at a time.

Penetration Test.

The Technical Specification For Shock Absorbing Concrete (SACON®)—Shock Absorbing Concrete For Constructing Live-Fire Training Facilities has a penetration test for ballistic structures. Section 3.3.4.1 Penetration Test reads:

All SACON® wall panels and other cast objects shall be individually tested with a live-fire test of an M855 round fired from an M16A2 rifle at a distance of 25-m (82-ft) and measured for penetration depth to the back of the bullet. Any penetration depth less than 25-mm (1-in.) or greater than 125-mm (5-in.) shall constitute a failure. Those objects failing to meet the penetration depth requirement shall be discarded without further testing or modifications.

For SACON® wall panels and other cast objects that are intended for close quarter usage (distances less than 25-m (82-ft)), the live-fire test shall be conducted with an M855 round fired from a remotely fired M16A2 rifle from the usage distance. Any penetration depth less than 25-mm (1-in.) or greater than 125-mm (5-in.) shall constitute a failure. Those objects failing to meet the penetration depth requirement shall be discarded without further testing or modifications.

Those of skill in the art will recognize that the term M855 round is the United States military name for the cartridge called the 5.56 NATO round or more specifically, the 5.56 NATO, 62 grain, green tip round. Those of skill in the art will recognize that a bullet is a projectile that is fired from a round (sometimes cartridge) that includes the bullet, casing, propellant, and primer.

SUMMARY OF THE DISCLOSURE

In particular non-limiting embodiments, the present disclosure provides a method for creating a bullet absorbing structural component made with ballistic concrete. The bullet absorbing structural component made with ballistic concrete comprising:

(a) about 1 part by mass Portland cement;

(b) about 0.5 to 1.5 part by mass fine aggregate;

(c) about 0.005 to 0.15 part by mass fiber;

(d) about 0.005 to 0.05 part by mass calcium phosphate;

(e) about 0.005 to 0.05 part by mass aluminum hydroxide; and (f) about 0.0005 to 0.05 part by mass air entrainment additive, such that the bullet absorbing component is capable of passing the penetration test described above.

In one non-limiting embodiment, the bullet absorbing component comprises (a) about 0.8 to 1.2 part by mass fine aggregate;

(b) about 0.008 to 0.012 part by mass fiber;

(c) about 0.008 to 0.012 part by mass calcium phosphate;

(d) about 0.008 to 0.012 part by mass aluminum hydroxide; and (e) about 0.0008 to 0.002 part by mass air entrainment additive.

In another non-limiting embodiment, the bullet absorbing component comprises (a) about 0.9 to 1.1 part by mass fine aggregate;

(b) about 0.009 to 0.011 part by mass fiber;

(c) about 0.009 to 0.011 part by mass calcium phosphate;

(d) about 0.009 to 0.011 part by mass aluminum hydroxide; and (e) about 0.0009 to 0.0015 part by mass air entrainment additive.

The mixture comprising the Portland cement, the fine aggregate, the fiber; the calcium phosphate, the aluminum hydroxide, and the air entrainment additive may be mixed until the mixture has a density within a range of 88 to 94 pounds per cubic foot. The teachings of the present disclosure may be used to create a ballistic concrete without the use of the calcium phosphate and aluminum hydroxide if lead-leaching control is not an objective.

In one non-limiting embodiment, the fiber may be a polyolefin fiber, which may or may not be fibrillated. In another embodiment the air entrainment additive is DaraFill® Dry.

The bullet absorbing component may have air bubbles resulting from the air entrainment additive that are less than about 0.04 inches (1 mm) in diameter. Alternatively, the bullet absorbing component may have air bubbles resulting from the air entrainment additive that are greater than 0.0004 inches (10 μm) in diameter. In another non-limiting embodiment, the bullet absorbing component has air bubbles resulting from the air entrainment additive that are less than about 0.04 inches (1 mm) in diameter and greater than 0.0004 inches (10 μm) in diameter.

The training with the live ammunition may be performed with at least one of the following types of weapons:

0.22 caliber weapon, 0.38 caliber weapon, 0.40 caliber weapon, 0.45 caliber weapon, 5.56 mm weapon, 6.8 mm weapon, 7.62 mm weapon, 9 mm weapon or a grenade or other fragmentation device.

The facility may be a training village, an assault house, a shoot house, a mock cave, or a live-fire practice range. The bullet absorbing component may be a backstop. Moreover, the bullet absorbing components may be made on site or at facility and brought to the location for use.

BRIEF DESCRIPTION OF THE FIGURES

The disclosure can be better understood with reference to the following figures.

FIG. 1 sets forth the prior art process 1000 for making SACON® ballistic concrete as done in the prior art using a foam made with water, foaming agent, and at least one foam stabilizing agent.

DETAILED DESCRIPTION

Definitions

Figure 2:
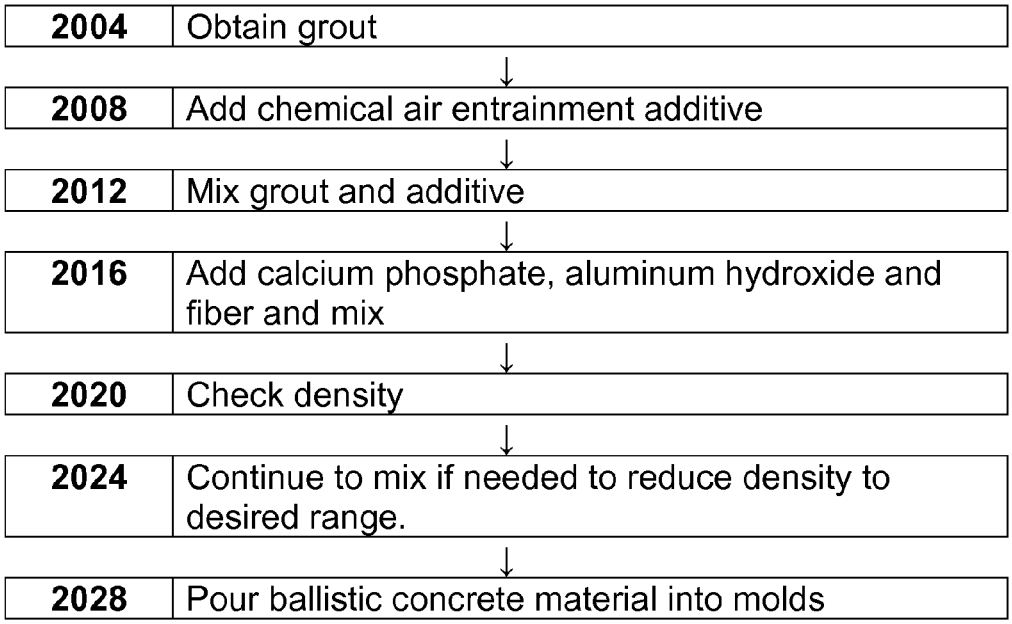
FIG. 2 summarizes the process 2000 for making bullet absorbing components using ballistic concrete made with chemical air entrainment additive rather than foam.

The term "fine aggregate" means natural sand (including quartz, chert, igneous rock and shell fragments), limestone (calcium carbonate), manufactured sand (crushed stone, recycled concrete, slag) ranging from mesh size #8 to #200 (2.4 mm to 0.07 mm) In preferred, non-limiting embodiments the fine aggregate is masonry sand (ASTM C 144) or general concrete sand (ASTM C 33) meeting the size criteria. In one non-limiting embodiment the fine aggregate is saturated surface dry (SSD) material, see ASTM C 128.

The term "fiber" means concrete additives to reinforce the concrete with may be steel, alkali-resistant glass strands, or synthetic polymers. In preferred, non-limiting embodiments the fiber is a polyolefin, a polyester, a polyamide, (e.g., Kevlar®, nylon, polyester, polyethylene, polypropylene) or a mixture thereof, which may be a monofilament, fibrillated, or structured fibers (macrofibers). In one embodiment, the fibers meet ASTM C 1116 standards, such as ASTM C 1116 Type III requirements for polypropylene or ASTM C 1116 Type I for steel. Non-limiting examples include Grace Fibers™ (W.R. Grace & Co., Cambridge, Mass.); Nylon—N6600, Polyester—PE7, Polypropylene—CFP 1000, Polypropylene—PP7 (Concrete Fibers Inc., Dallas, Tex.); Nycon-MM, NYCON-PVA, Nycon-RECS100, Nycon-RF4000, Nycon-RSC15, Nycon-XL (Nycon Corp., Fairless Hills, Pa.); ENDURO® 600, Fibercast® 500 for Precast, Fibercast® 510, Fibermesh® 150, Fibermesh® 300, Fibermesh® 650, Novocon® 1050, Novocon® XR, Novomesh® 850, Novomesh® 950 (Propex Concrete Systems Corp., Chattanooga, Tenn.); PSI Fibers™ (PSI Packaging, LaFayette, Ga.). Additional examples of suitable fibers include fibers described in U.S. Pat. No. 5,456,752 (Hogan); U.S. Pat. No. 6,423,134 (Trottier et al.); U.S. Pat. No. 6,582,511 (Velpari); or U.S. Pat. No. 6,758,897 (Rieder et al.), the contents of which are hereby incorporated by reference in their entirety.

The term "air entrainment additive" means admixtures that are part of the ballistic concrete mix to incorporate air bubbles of controlled sizes in the ballistic concrete matrix. These admixtures stabilize the air bubbles entrained during the mechanical mixing of ballistic concrete by the mixer blades. Examples of air entrainment additives include, but are not limited to, DaraFill® Dry or wet DaraFill formulations (W.R. Grace & Co.), Rheocell® Rheofill™ (BASF Construction Chemicals, Cleveland, Ohio), Micro Air® (BASF Construction Chemicals), EUCON EASY FILL (Euclid Chemical Co., Cleveland, Ohio), Fritz-Pak Fill Flow (Fritz-Pak, Dallas, Tex.). Additional examples of air entrainment additives may be found in U.S. Pat. No. 4,488,910

(Nicholson et al.); U.S. Pat. No. 4,737,193 (Gutmann et al.); U.S. Pat. No. 4,249,948 (Okada et al.); U.S. Pat. No. 4,046,582 (Kawamura et al.); or the Portland Cement Association publication entitled "Manual on Control of Air Content in Concrete" (PCA EB 116), the contents of which are hereby incorporated by reference in their entirety.

The term "depth of penetration" with respect to a bullet penetration into a barrier is measured by inserting a measuring implement into the hole formed by the bullet and measuring from the point of entry to the trailing end of the bullet. Thus, the maximum penetration is actually a bit deeper than the measured penetration as the bullet, while altered in shape from the impact has a non-zero length. The depth of penetration of bullets into the absorbing material may be measured using alternative methods known to those skilled in the art. Laser based tools such as a laser range finder may also be used.

Preparations of Bullet Absorbing Component

In a non-limiting formulation, the bullet absorbing components are prepared by mixing cement, fine aggregate, and water to form a grout. The grout may be obtained from a ready mix concrete supplier.

Next an air entrainment additive is mixed into the grout. Then calcium phosphate, aluminum hydroxide and fiber are added. After mixing for a number of minutes the density is checked. As noted below, the addition of the calcium phosphate and aluminum hydroxide may be omitted if preventing lead leaching is not a concern.

If the mixture is above the target density range, additional mixing adds additional entrained air bubbles to reduce the density. The process of measuring density and providing additional mixing is repeated until the measured density is within a target range of the optimal density.

When the density is deemed appropriate, the ballistic concrete is poured into molds to form the component. Typically, the ballistic concrete is allowed to harden and cure for at least 4 weeks. Batching, mixing, transporting, testing, curing and placing the ballistic concrete would preferably meet the standards described in the Army Corp. of Engineers guidelines "Technical Specification for Shock Absorbing Concrete (SACON®)":

American Concrete Institute (ACI) Standards

ACI 117 (1990) Standard Specifications for Tolerances for Concrete Construction and Materials ACI 301 (1999) Standard Specification for Structural Concrete ACI 304R (2000) Guide for Measuring, Mixing, Transporting, and Placing Concrete ACI 305R (1999) Hot Weather Concreting ACI 306R (1997) Cold Weather Concreting ACI 544.1R (1996) State-of-the-Art Report in Fiber Reinforced Concrete ACI 544.2R (1999) Measurement of Properties of Fiber Reinforced Concrete American Society for Testing and Materials ASTM C 33 (2001) Standard Specification for Concrete Aggregate ASTM C 39 (2001) Standard Test Method for Compressive Strength of Cylindrical Concrete Specimens ASTM C 94 (2000) Standard Specifications for Ready-Mixed Concrete ASTM C 138 (2001) Standard Test Method for Density (Unit Weight), Yield, and Air Content (Gravimetric) of Concrete ASTM C 144 (2002) Standard Specification for Aggregate for Masonry Mortar ASTM C 150 (2002) Standard Specification for Portland Cement ASTM C 171 (1997) Standard Specification for Sheet Materials for Curing Concrete ASTM C 172 (1999) Standard Practice for Sampling Freshly Mixed Concrete ASTM C 567 (2000) Standard Test Method for Unit Weight of Structural Lightweight Concrete ASTM C 1116 (2002) Standard Specification for Fiber-reinforced Concrete and Shotcrete Us Army Corps of Engineers Handbook for Concrete and Cement (CRD)

CRD-C 400 (1963) Requirements for Water for Use in Mixing or Curing Concrete

National Ready-Mixed Concrete Association (NRMCA)

NRMCA QC 3 (January 1990; 9th Rev) Quality Control Manual: Section 3, Plant Certifications Checklist: Certification of Ready-Mixed Concrete Production Facilities NRMCA CPMB 100 (January 1990; 9th Rev) Concrete Plant Standards NRMCA TMMB 1 (1989; 13th Rev) Truck Mixer and Agitator Standards The Portland cement used would preferably be ASTM C 150 Type I-II. The fine aggregate may be masonry sand (ASTM C 144), or general concrete sand (ASTM C 33).

The calcium phosphate may be granulated bone meal, bone ash, or precipitated calcium phosphate. In one non-limiting embodiment, it is technical grade or higher. The aluminum phosphate may be metakaolinite or precipitated aluminum hydroxide. In one non-limiting embodiment, it is technical grade or higher. Color pigments may be optionally added to create the appearance rocks, trees, buildings, etc. Suppliers of concrete pigments include Scofield Co. (Douglasville, Ga.) or Lambert Corp. (Orlando, Fla.). Thus, the present disclosure teaches the option of pigmented bullet absorbing components.

The present disclosure teaches the creation of components made from wet ballistic concrete prepared without an addition of preformed foam.

One of skill in the art of ballistic concrete manufacturing would recognize that these materials are prepared on industrial scale and accordingly quantities and proportions may vary in accordance with industry norms. In addition, one skilled in ballistic concrete manufacturing would recognize that materials may be measured by volume or by timed delivery from a storage container.

The following examples further illustrate the various teachings of the disclosure and are not intended to limit the scope of the claimed invention.

Preparation of Components for Use Live Fire Ammunition

The ingredients for making the ballistic concrete components are as follows:

| | Amount per unit ballistic concrete in | |
|---|---|---|
| Ingredient | English System | Metric System |
| Portland Cement | 972 pounds | 441 kilograms |
| Fine Aggregate (SSD) | 972 pounds | 441 kilograms |
| Water | 466 pounds | 211 kilograms |
| Calcium Phosphate | 9.72 pounds | 4.41 kilograms |
| Aluminum Hydroxide | 9.72 pounds | 4.41 kilograms |
| DaraFill ® Dry | 11.4 ounces | 323 grams |
| Grace Fibers ™ | 14.8 pounds | 6.71 kilograms |

FIG. 2 summarizes a process 2000 for making bullet absorbing components. As noted below, some of the steps may be performed in slightly different orders but for sake of clarity, it is useful to introduce one sequence of steps for discussion rather than muddy the water with premature digressions on alternatives. The steps may be summarized as follows:

Step 2004—Obtain a grout of Portland cement, fine aggregate, and water in a mixer in accordance with ACI standard 304R and/or ASTM standard C 94. *In one embodiment, the water is about 0.48 part by mass (466 pounds of water/972 pounds of cement=0.479 part by mass water).* The act of obtaining includes creating the grout or obtaining the grout from some third party.

Step 2008—Add a chemical air entrainment additive (DaraFill® Dry, W. R. Grace & Co.).

Step 2012—Following the addition of the additive, mix the grout for five minutes. Mixing may be achieved by rotating the drum on a cement mixer truck.

Step 2016—Add Calcium Phosphate, Aluminum Hydroxide, and fiber. One suitable fiber is Grace Fibers™. Mix for an additional ten minutes.

Step 2020—Check density such as by weighing using a ¼ cubic foot testing pot. Target weight is 22.7 pounds (approximately 91 pounds per cubic foot) as the actual target is 91 pounds per cubic foot±3 pounds per cubic foot.

Step 2024—Continue to mix if needed to reduce density to desired range. Additional mixing lowers the density. Continue to mix, checking frequently, until target density is achieved. The target wet density material when poured into components is 1458 kg/m$^3$ (91-pounds per cubic foot+3 pounds per cubic foot).

Step 2028—Pour ballistic concrete material into molds. As with traditional SACON® type ballistic concrete, vibration such as may be used with standard structural concrete is to be avoided to minimize destruction of air bubbles.

Changes in Order and Additives.

Note that the step of adding the calcium phosphate and aluminum hydroxide could be done at the same time as adding the chemical air entrainment additive.

Note further, that as the calcium phosphate and aluminum hydroxide are added to reduce lead-leaching from ballistic concrete blocks which have absorbed ammunition with lead components; these chemicals are not central to the ballistic properties of the ballistic concrete. Thus, in applications where the need to reduce lead-leaching is not important (whether because of local rules, post use disposal plans, or a movement to ammunition with minimal or no lead), one can make ballistic concrete in accordance with the teachings of the present disclosure without addition of calcium phosphate or aluminum hydroxide.

The fiber may be added at the same time as the chemical air entrainment additive (and possibly the calcium phosphate and aluminum hydroxide) as this process does not require achieving a pre-fiber density before adding the fiber. When the process is modified so that there is not a need to add material after five minutes of mixing, simply mix for fifteen minutes before checking density. Additional mixing may be required to reduce density.

After filling the molds, the material may be optionally tapped down with a rod to eliminate voids around embedments in the casting forms. Not all components will be poured into molds with embedments. Molds without embedments may not need a rod to eliminate any voids, but a form with an embedment such as a window cutout may need a treatment with a rod to eliminate voids.

Less Restrictions on Pouring.

Unlike traditional SACON® type ballistic material with fragile foam bubbles, ballistic material made in accordance with the teachings of the present disclosure is not limited to a 2 foot maximum drop during pouring or a 2 foot maximum depth of a pour. Thus, unlike traditional SACON® type ballistic material, ballistic material made in accordance with the teachings of the present disclosure may be poured into wall panels oriented in their final vertical orientation. Optionally, ballistic material made in accordance with the teachings of the present disclosure may be poured into molds with pour heights well in excess of 2 feet tall. Pours of greater than 3 feet in height are obtainable. Pours of greater than 6 feet in height are obtainable. Pours of greater than eight feet in height from bottom to top of mold are obtainable. Pour structures of full height walls of eight feet or more may be done.

Quicker Turn-Around on Use of Mold Components.

While traditionally, SACON® ballistic concrete components have been left in the molds for fourteen days with the sides only removed after three days, an alternative process viable with the improved ballistic concrete is to remove the sides of the forms within 24 hours and remove the bottom of the form after at least three days.

Those of skill in the art will recognize that the ability to remove the mold components significantly faster results in an overall throughput of molded panels of more than 300% for a given investment in molds. Thus, less money needs to be tied up in molds, transportation and storage of molds. T The component is wrapped in plastic to assure adequate hydration during curing. One of skill in the art will recognize that the timing of these steps may be adjusted based on weather conditions, particularly temperature but also factoring humidity. The components are allowed to harden and dry and are ready for use and/or testing after 28 days.

One of skill in the art will recognize that the fibers enhance the strength and resilience of the components and ability of the molded components to withstand a bullet entry without spalling. Spalls are flakes of material that are broken off a larger solid body such as the result of projectile impact, weathering, or other causes. It is desired that the molded components retain their structural integrity with the exception of the trail formed by the bullet entry. Thus while the fibers are important, one of skill in the art can identify and substitute other fibers that are suitable for the task, see e.g., paragraph defining term fiber in definitions section above. The choice of fibers will impact the overall density of the wet material as the weight of the fibers impact the density calculation.

Benefits of the Improved Bullet Absorbing Components

To date, the improved bullet absorbing components have consistently performed well in ballistic testing. Anecdotal evidence suggests significantly higher failure rates for traditional SACON® ballistic concrete than with the improved production process. These failure rates may be due to a lack of consistency of the product using traditional SACON® ballistic concrete. The improved production process produces a very consistent material with an extremely low (much less than 1%) failure rate of the penetration test listed above.

Other benefits for the improved ballistic concrete are the predictable and uniform results in ballistic performance when the mix falls within the target density range. By uniform results, it is meant that penetration tests on different parts of a panel made with the improved ballistic panel will all pass the penetration test.

The process is sufficiently predictable that when a sample falls outside of the target range for density after the prescribed mixing period, this aberrant result is a strong indicator that the sand used in the mix is out of specifications, perhaps because of inclusion of clay or another contaminant.

Modification for Slower Projectiles

Those of skill in the art, recognize that the muzzle velocities for different types of ammunition differs a considerable amount. For example, within pistols, the muzzle velocity of a 9 mm handgun is significantly higher than the muzzle velocity of a 45 caliber pistol. The muzzle velocity for a given type of ammunition will actually depend on part on the length of the barrel of the gun.

In order to design a ballistic barrier for a lower velocity projectile than used in the standard penetration test described above, the ballistic barrier must be made easier to penetrate so that the back end of the projectile penetrates more than one inch into the ballistic barrier. Increasing the amount of chemical air entrainment additive and or increasing the mix time to downwardly adjust the density target for the ballistic material will enable the ballistic panel to be tuned for use with a particular lower velocity projectile. Density of the ballistic concrete may be dropped by simply mixing longer without changing the amount of air entrainment additive. May need to augment with additional air entrainment additive for a severe change in density.

Modifications for Other Bullet Depth Ranges.

One of skill in the art could modify the teachings of the present disclosure to tune the ballistic concrete to capture a bullet from a prescribed round, firearm, and firing distance within a depth range that is different from the 1 to 5 inch range referenced above. Thus, a ballistic concrete component could be tuned to capture bullets in a depth range of 2 to 6 inches of depth as measured to the part of the bullet closest to the entry point, or 0.5 inches to 3 inches of depth as measure to the part of the bullet closest to the entry point.

It is to be understood that, while the teachings of the disclosure have been described in conjunction with the detailed description, thereof, the foregoing description is intended to illustrate and not limit the scope of the claimed invention. Other aspects, advantages, and modifications of the teachings of the disclosure are within the scope of the claims set forth below. All publications, patents, and patent applications cited in this specification are herein incorporated by reference as if each individual publication or patent application was specifically and individually indicated to be incorporated by reference.

One of skill in the art will recognize that some of the alternative implementations set forth above are not universally mutually exclusive and that in some cases additional implementations can be created that employ aspects of two or more of the variations described above. The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method for creating a bullet absorbing structural component made from ballistic concrete, the method comprising:

*forming* the bullet absorbing structural component *by combining multiple components in a mixer,* comprising:

(i) about 1 part by mass [Portland] cement;

(ii) about 0.5 to 1.5 part by mass fine aggregate;

(*iii*) *about 0.48 part by mass water;*

([iii] *iv*) about 0.005 to 0.15 part by mass fiber;

([iv] *v*) about 0.005 to 0.05 part by mass calcium phosphate;

([v] *vi*) about 0.005 to 0.05 part by mass aluminum hydroxide; and ([vi] *vii*) [about 0.0005] *between 0.001* to *about* 0.05 part by mass air entrainment additive;

such that the bullet absorbing structural component is capable of stopping a live-fire test of an M855 round with a bullet fired from an M16A2 rifle at a distance of 82-ft with a penetration depth of between 1 and 5 inches as measured to a back of the bullet from a point of bullet entry on the bullet absorbing structural component*; and*

*wherein the bullet absorbing structural components are made with a maximum pour drop of the ballistic concrete exceeding 2 feet.*

2. The method of claim 1, wherein the bullet absorbing structural component comprises:

(i) about 0.8 to 1.2 part by mass, fine aggregate;

(ii) about 0.008 to 0.012 part by mass, fiber;

(iii) about 0.008 to 0.012 part by mass, calcium phosphate; *and*

(iv) about 0.008 to 0.012 part by mass, aluminum hydroxide[; and (v) about 0.0008 to 0.002 part by mass, air entrainment additive].

3. The method of claim 2, wherein the bullet absorbing structural component comprises:

(i) about 0.9 to 1.1 part by mass, fine aggregate;

(ii) about 0.009 to 0.011 part by mass, fiber;

(iii) about 0.009 to 0.011 part by mass, calcium phosphate; *and*

(iv) about 0.009 to 0.011 part by mass, aluminum hydroxide[; and (v) about 0.0009 to 0.0015 part by mass, air entrainment additive].

4. The method of claim 1, wherein the fiber is a polyolefin fiber.

5. The method of claim 4, wherein the polyolefin fiber is a fibrillated fiber.

6. The method of claim 1, wherein the air entrainment additive is DaraFill® Dry.

7. The method of claim 1, wherein a mixture comprising the [Portland] cement, the fine aggregate, the fiber; the calcium phosphate; the aluminum hydroxide; and the air entrainment additive *is* mixed until the mixture has a wet density within a range of 88 to 94 pounds per cubic foot.

8. The method of claim 1, wherein the bullet absorbing structural component has air bubbles resulting from the air entrainment additive that are less than about 0.04 inches (1 mm) in diameter.

9. The method of claim 1, wherein the bullet absorbing structural component has air bubbles resulting from the air entrainment additive that are greater than 0.0004 inches (10 μm) in diameter.

10. The method of claim 1, wherein the bullet absorbing component has air bubbles resulting from the air entrainment additive that are less than about 0.04 inches (1 mm) in diameter and greater than 0.0004 inches (10 μm) in diameter.

11. The method of claim 1, wherein the bullet absorbing structural components are made on site at a training facility that will use the bullet absorbing structural component to capture live fire ammunition used at the training facility.

[12. The method of claim 1 wherein the bullet absorbing structural components are made with a maximum pour drop of the ballistic concrete exceeds 2 feet.]

13. The method of claim 1 wherein the bullet absorbing structural components are made with a maximum pour drop of the ballistic concrete [exceeds] *exceeding* 6 feet.

14. The method of claim 1 wherein the bullet absorbing structural components are poured with a maximum depth of more than 2 feet while in a mold.

15. The method of claim 1 wherein the bullet absorbing structural components are poured with a maximum depth of more than 3 feet while in a mold.

16. The method of claim 1 wherein the bullet absorbing structural components are poured with a maximum depth of more than 6 feet while in a mold.

17. The method of claim 1 wherein an upright wall panel is poured in place for a wall with a height of more than 6 feet measured from a bottom of the mold.

18. A method for creating a bullet absorbing structural component made from ballistic concrete *by combining multiple components in a mixer*, the method comprising:

obtaining a grout of [Portland] cement, fine aggregate and water in a mixer;

adding chemical air entrainment additive;

adding fiber to the grout;

*forming the bullet absorbing structural component by* mixing until the wet density of the grout falls within a desired density range for use in a bullet absorbing structural component for use with weapon using a particular round with a bullet fired from a particular distance so that a back edge of a bullet from a round fired perpendicularly towards a cured bullet absorbing structural component is within a range of 1 inches to 5 inches as measured from a point of bullet entry on the bullet absorbing structural component*; and*

*wherein the ballistic concrete is poured into a mold such that a maximum height of the poured ballistic concrete exceeds 2 feet*.

19. The method of claim 18 wherein the round is an M855 round with a bullet fired from an M16A2 rifle at a distance of 82-ft.

20. The method of claim 18 wherein mixing continues until the wet density is within a range of 88 to 94 pounds per cubic foot.

21. The method of claim 18 wherein the grout is mixed for several minutes after the addition of the chemical entrainment additive before the addition of the fiber.

22. The method of claim 18 wherein additives are added to the grout to reduce lead leaching from a bullet absorbing structural component which is used to absorb bullets containing lead.

23. The method of claim 22 wherein the additives are calcium phosphate and aluminum hydroxide.

[24. The method of claim 18 wherein the ballistic concrete is poured into a mold such that a maximum height of the poured ballistic concrete exceeds 2 feet.]

25. The method of claim 18 wherein the ballistic concrete is poured into a mold such that a maximum height of the poured ballistic concrete exceeds 3 feet.

26. The method of claim 18 wherein the ballistic concrete is poured into a mold such that a maximum height of the poured ballistic concrete exceeds 6 feet.

27. The method of claim 18 wherein ballistic concrete is poured into a mold having removable side walls and the side walls are removed from the mold within 24 hours of completing a pour into the mold.

28. The method of claim 18 wherein bullet absorbing structural component is made from ballistic concrete poured into a mold and the bullet absorbing structural component is removed from all portions of the mold within three days of completing the pour into the mold.

29. The method of claim 18 wherein the ballistic concrete is made without an addition of a wet foam comprising water, a foaming agent, and a foam stabilizing agent.

*30. A method for creating a bullet absorbing structural component made from ballistic concrete by combining multiple components in a mixer, the method comprising:*

*obtaining a grout of cement, fine aggregate and water in a mixer;*

*adding chemical air entrainment additive;*

*adding fiber to the grout;*

*forming the bullet absorbing structural component by mixing until the wet density of the grout falls within a desired density range for use in a bullet absorbing structural component for use with weapon using a particular round with a bullet fired from a particular distance so that a back edge of a bullet from a round fired perpendicularly towards a cured bullet absorbing structural component is within a range of 1 inches to 5 inches as measured from a point of bullet entry on the bullet absorbing structural component; and*

*wherein ballistic concrete is poured into a mold having removable side walls and the side walls are removed from the mold within 24 hours of completing a pour into the mold.*

*31. The method of claim 30 wherein bullet absorbing structural component is made from ballistic concrete poured into a mold and the bullet absorbing structural component is removed from all portions of the mold within three days of completing the pour into the mold.*

* * * * *